US008899662B2

(12) United States Patent
Kido et al.

(10) Patent No.: US 8,899,662 B2
(45) Date of Patent: Dec. 2, 2014

(54) VEHICLE-BODY FRONT STRUCTURE

(75) Inventors: Hiroto Kido, Hiroshima (JP);
Masanobu Fukushima, Hiroshima (JP);
Isamu Kizaki, Hiroshima (JP); Satoshi Nakamura, Hiroshima (JP); Keizo Kawasaki, Hiroshima (JP); Manabu Hashimoto, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 34 days.

(21) Appl. No.: 13/349,742

(22) Filed: Jan. 13, 2012

(65) Prior Publication Data

US 2012/0205944 A1    Aug. 16, 2012

(30) Foreign Application Priority Data

Feb. 10, 2011   (JP) ................. 2011-026687

(51) Int. Cl.
*B62D 21/15* (2006.01)
*B62D 25/08* (2006.01)

(52) U.S. Cl.
CPC .................................... *B62D 25/088* (2013.01)
USPC ............. 296/187.09; 296/193.09; 296/203.02

(58) Field of Classification Search
USPC ................ 296/203.02, 187.09, 187.1, 193.09
See application file for complete search history.

(56) References Cited

U.S. PATENT DOCUMENTS

| | | | | |
|---|---|---|---|---|
| 7,845,716 B2 * | 12/2010 | Kiyotake et al. | ......... | 296/203.02 |
| 2005/0046237 A1 | 3/2005 | Miyoshi et al. | | |
| 2007/0215402 A1 | 9/2007 | Sasaki et al. | | |
| 2009/0243336 A1 | 10/2009 | Honji et al. | | |
| 2011/0095568 A1 * | 4/2011 | Terada et al. | ............ | 296/187.09 |

FOREIGN PATENT DOCUMENTS

| | | |
|---|---|---|
| CN | 1590188 A | 3/2005 |
| CN | 101037118 A | 9/2007 |
| CN | 101070079 A | 11/2007 |
| JP | 2003-019978 A | 1/2003 |
| JP | 2005-335619 A | 12/2005 |
| JP | 2007-302127 A | 11/2007 |
| JP | 2009-214654 A | 9/2009 |
| JP | 2009-234495 A | 10/2009 |
| JP | 2010-083187 A | 4/2010 |
| JP | 2010-083196 A | 4/2010 |

OTHER PUBLICATIONS

The first Office Action issued by the Chinese Patent Office on Jul. 16, 2014, which corresponds to Chinese Patent Application No. 201210027651.0 and is related to U.S. Appl. No. 13/349,742; with English language conclusive opinion.

\* cited by examiner

*Primary Examiner* — Glenn Dayoan
*Assistant Examiner* — Melissa A Black
(74) *Attorney, Agent, or Firm* — Studebaker & Brackett PC

(57) ABSTRACT

A rear apron panel is provided between a suspension tower and a dash panel. A vertical branch brace is provided to extend upwardly from a front side frame along an inner face of a suspension tower to form a closed cross section with a rear portion of the suspension tower. A deformation restraint member interconnects the apron frame and the vertical branch brace. Accordingly, there is provided a vehicle-body front structure which can restrain the apron frame from deforming outwardly in the vehicle width direction in the vehicle frontal collision to prevent the dash panel from moving back into the vehicle compartment too much.

12 Claims, 6 Drawing Sheets

OUT ←   → IN

VEHICLE-BODY FRONT STRUCTURE

BACKGROUND OF THE INVENTION

The present invention relates to a vehicle-body front structure which comprises a front side frame extending forwardly from a side portion of a dash panel of a vehicle, a hinge pillar extending vertically from a side end portion of the dash panel, and an apron frame provided on an outside of the front side frame in a vehicle width direction and extending forwardly from the hinge pillar.

It has been one of main subjects to make lightweight vehicles in order to improve the fuel economy (gas millage) and the like, and various researches and developments for these have been conducted up to date.

Making the thickness of frames and other members constituting a vehicle body thinner or decreasing the number of frames and the like are one of measures for making lightweight vehicles. In this case, however, there is a problem in that excessive thinness or decrease in number may cause difficulties in ensuring an appropriate vehicle function against collisions.

For example, in a case in which the above-described lightweight structure is applied to a front portion of the vehicle body which comprises a pair of hinge pillars extending vertically from both side end portions of a dash panel and a pair of apron frames extending forwardly from the hinge pillars, there is a problem in that the apron frames may improperly deform outwardly in a vehicle width direction in a vehicle frontal collision.

This outward deformation of the apron frames may cause a large load outwardly acting on the hinge pillars connected to rear portions of the apron frames, so that there is a concern that a connection portion of the hinge pillar to the side end portion of the dash panel may be broken, thereby the hinge pillar and the dash panel may be disconnected and the load inputting to the dash panel may not be transmitted to the hinge pillar.

Accordingly, when a power train, such as an engine or motor, retreats in the vehicle frontal collision, this retreat of the power train may cause the dash panel to move back into a vehicle compartment too much, thereby deteriorating the appropriate vehicle function against collisions.

Conventionally, meanwhile, a structure equipped with a vertical branch brace which is provided in back of a suspension tower to extend upwardly from a front side frame and connected to a rear portion of the suspension tower and a rear apron panel, thereby forming a closed cross section leading up to an upper portion of the rear apron panel has been proposed (see Japanese Patent Laid-Open Publication No. 2010-83187).

The structure disclosed in the above-described patent document enables a collision load inputted to the front side frame in the vehicle frontal collision to be efficiently transmitted to the hinge pillar through the vertical branch brace and the upper portion of the dash panel, so that the collision load can be dispersed effectively to a roof and other parts of the vehicle body via the hinge pillar. Thereby, any deformation of the front portion of the vehicle body can be restrained properly.

This structure, however, merely aims at the efficient transmission and dispersion of the collision load inputted to the front side frame toward the vehicle rear, and it does not restrain the apron frame from deforming outwardly in the vehicle width direction.

SUMMARY OF THE INVENTION

An object of the present invention is to provide a vehicle-body front structure which can restrain the apron frame from deforming outwardly in the vehicle width direction in the vehicle frontal collision so as to prevent the dash panel from moving back into the vehicle compartment too much.

According to the present invention, there is provided a vehicle-body front structure, comprising a front side frame extending forwardly from a side portion of a dash panel of a vehicle, a hinge pillar extending vertically from a side end portion of the dash panel, an apron frame provided on an outside of the front side frame in a vehicle width direction and extending forwardly from the hinge pillar, a suspension tower protruding toward a vehicle inside, an upper portion of which is connected the apron frame and a lower portion of which is connected to the front side frame, a rear apron panel provided between the suspension tower and the dash panel, a vertical branch brace provided to extend upwardly from the front side frame along an inner face of the suspension tower to form a closed cross section with the suspension tower, and a deformation restraint member interconnecting the apron frame and the vertical branch brace.

According to the present invention, since the apron frame provided on the outside of the front side frame in the vehicle width direction is connected to the vertical branch brace via the deformation restraint member, even when the collision load is inputted to the apron frame from the vehicle front in the vehicle frontal collision, the apron frame can be restrained from deforming outwardly in the vehicle width direction. That is, the rigidity around a connection portion of the hinge pillar to the side end portion of the dash panel can be improved, so that it can be properly prevented that the connection portion of the hinge pillar to the dash panel is broken, thereby the hinge pillar and the dash panel are disconnected. Thus, the dash panel can be restrained from moving back into the vehicle compartment too much even in the case of the load being inputted to the dash panel from the vehicle front in the vehicle frontal collision. Further, since the closed cross section is formed by the inner face of the suspension tower and the vertical branch brace, the vertical branch brace can reinforce the suspension tower properly, thereby restraining deformation of the suspension tower.

Herein, it may be further preferable that the vertical branch brace be connected to a rear portion of the suspension tower and the rear apron panel such that a closed cross section formed by the vertical branch brace and the rear portion of the suspension tower and the rear apron panel extends from the front side frame to an upper portion of the rear apron panel.

According to an embodiment of the present invention, the deformation restraint member is connected to a rear end portion of the suspension tower. Thereby, even when it is inputted to the suspension tower from the vehicle front in the vehicle frontal collision, the collision load can be transmitted and dispersed to the vertical branch brace and the apron frame through the deformation restraint member. Thus, an efficient disperse of the collision load to the vehicle rear can be achieved, so that an impact applied to the suspension tower can be decreased, and retreat and deformation of the suspension tower can be restrained. Accordingly, the transmission and disperse of the collision load via the vertical branch brace can be achieved efficiently. Further, while it is considered that a large load may be inputted to the suspension tower from a front wheel via a front suspension in the vehicle frontal collision, since the large load inputted to the suspension tower can be transmitted and dispersed to the vertical branch brace and the apron frame through the deformation restraint member, the retreat and deformation of the suspension tower can be restrained as well.

According to another embodiment of the present invention, the deformation restraint member, the vertical branch brace, the dash panel, and the apron frame form a closed space. Thereby, the rigidity of the vehicle rear body in back of the suspension tower can be improved. Accordingly, the collision load from the vehicle front can be efficiently transmitted and dispersed to the vehicle rear.

According to another embodiment of the present invention, the deformation restraint member is comprised of a plate member which extends vertically. Thereby, the lightweight vehicle structure can be provided, ensuring the appropriate vehicle function against collisions.

Other features, aspects, and advantages of the present invention will become apparent from the following description which refers to the accompanying drawings.

DETAILED DESCRIPTION OF THE INVENTION

Hereafter, a preferred embodiment of the present invention will be descried referring to the accompanying drawings.

Figure 1:
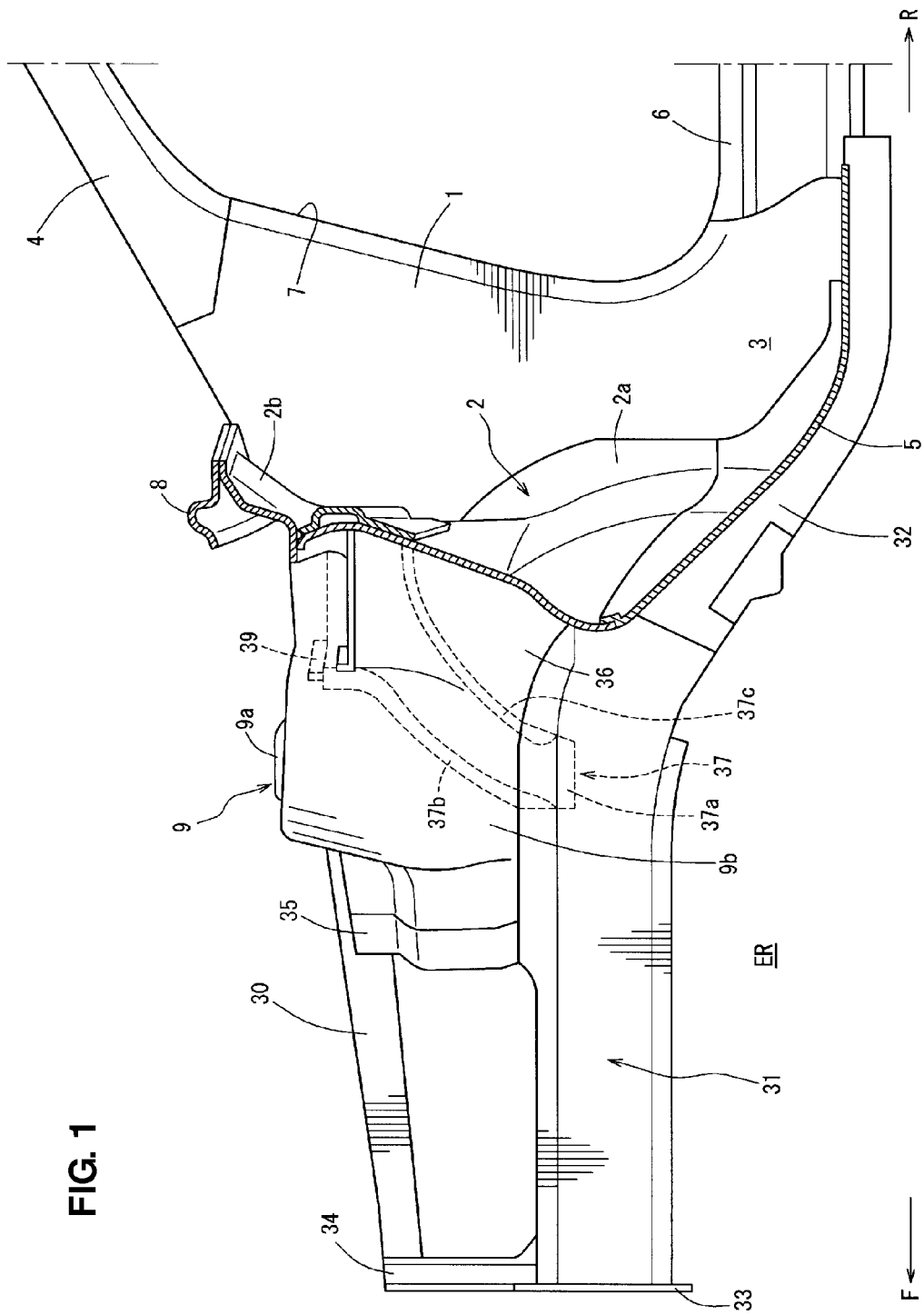
FIG. 1 is a side view of a vehicle-body front portion according an embodiment of the present invention, when viewed from a vehicle center in a vehicle width direction.
Figure 2:
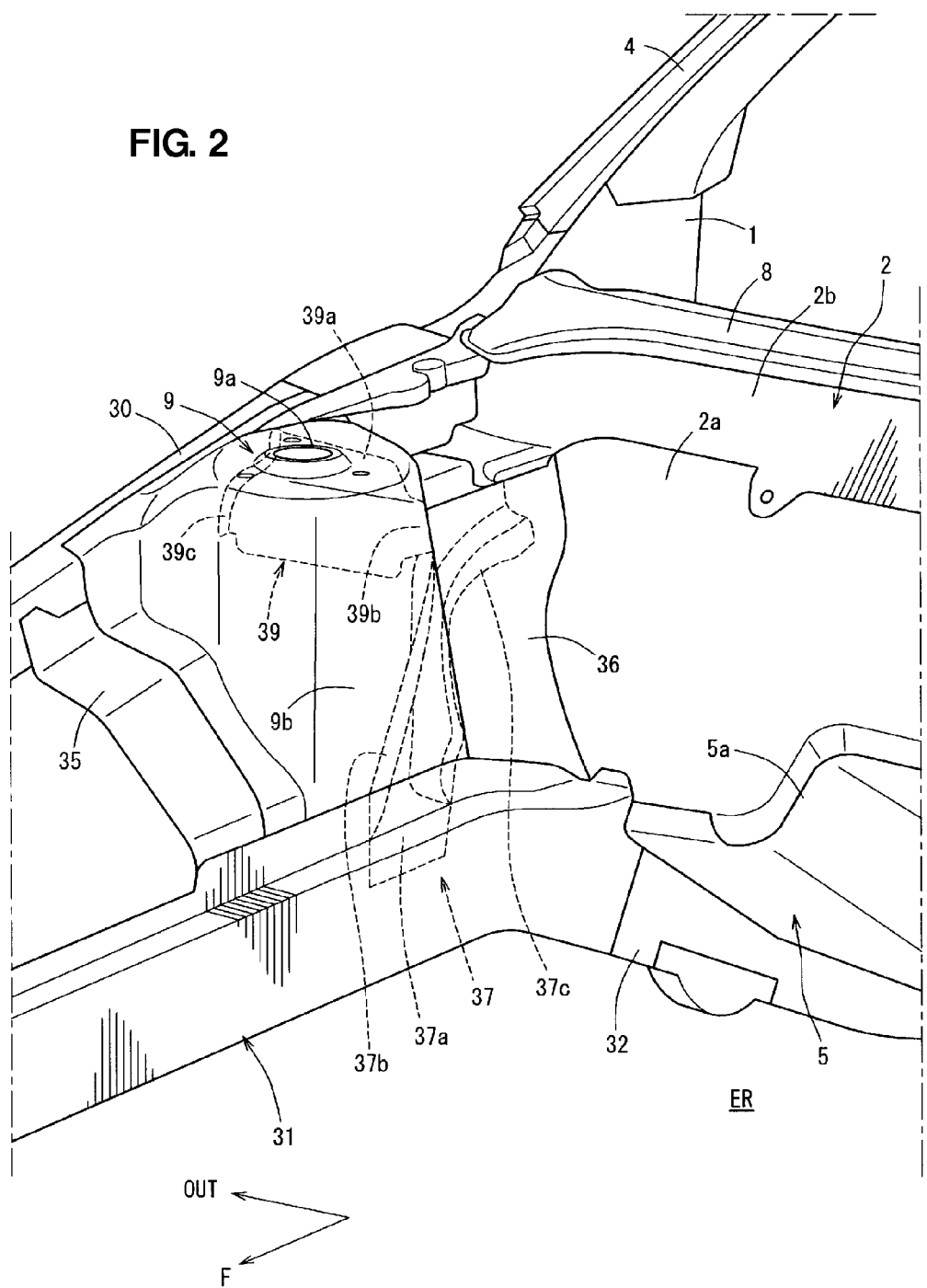
FIG. 2 is a perspective view of FIG. 1.
Figure 3:
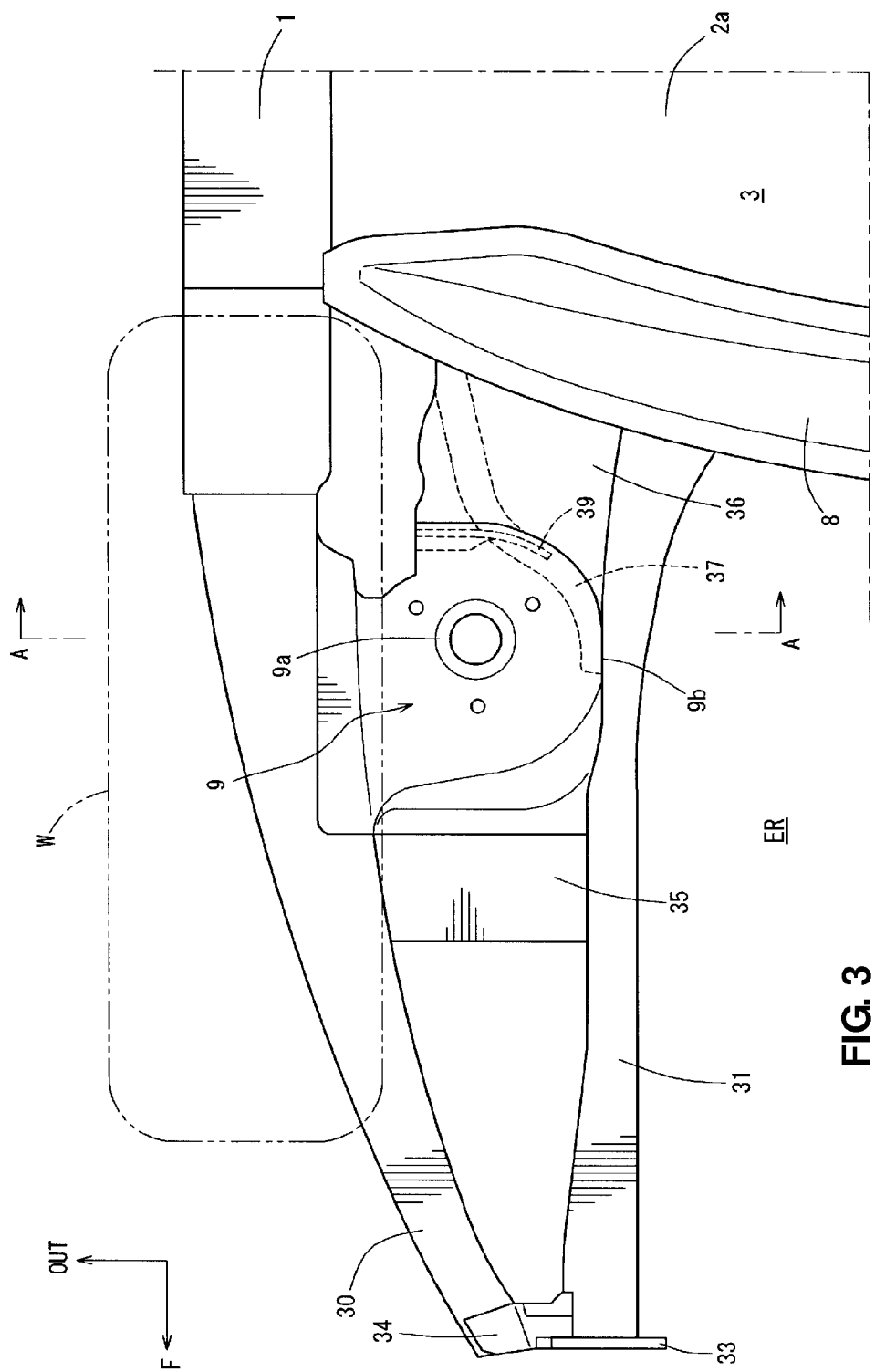
FIG. 3 is a plan view of FIG. 1.
Figure 4:
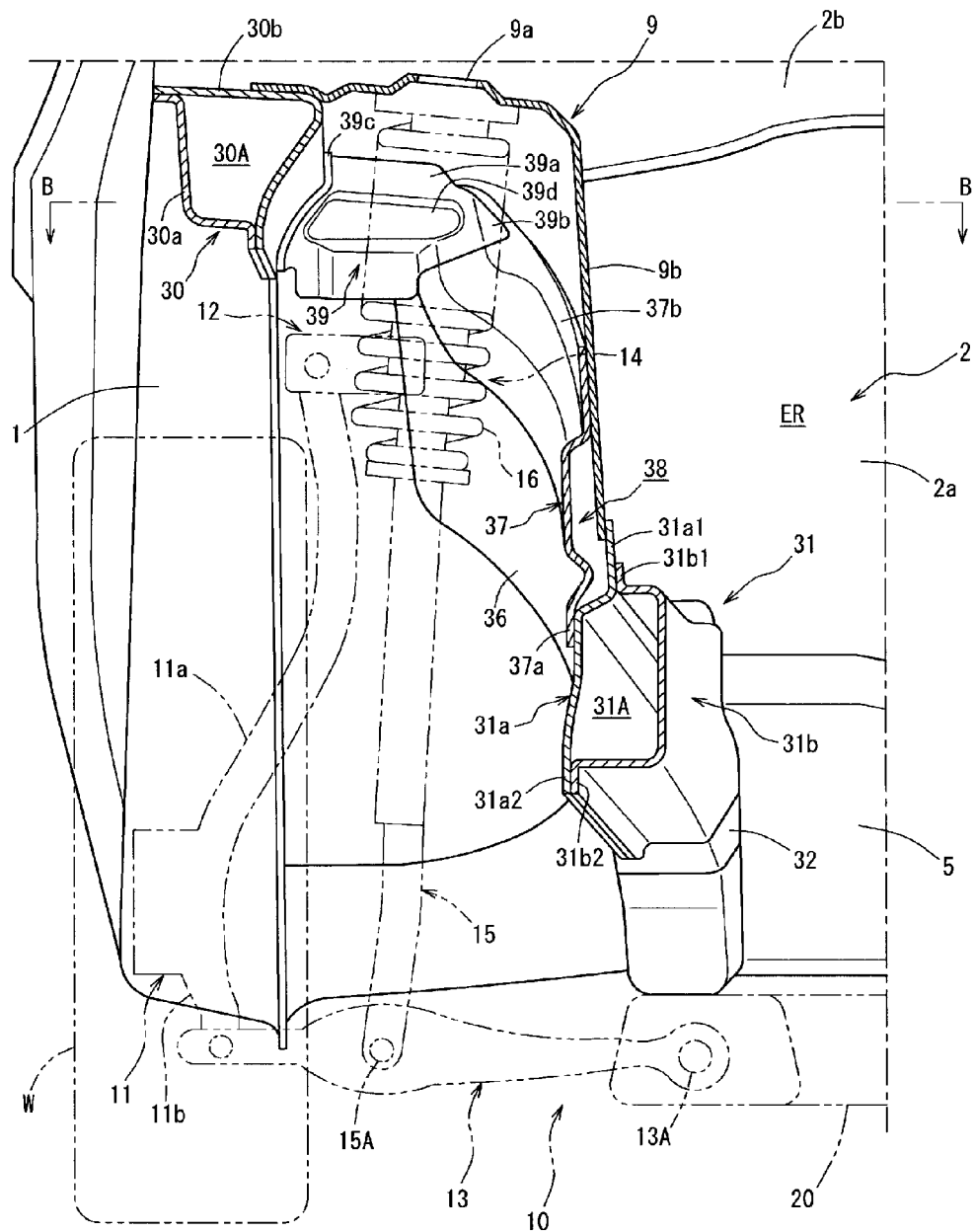
FIG. 4 is a sectional view taken along line A-A of FIG. 3.
Figure 5:
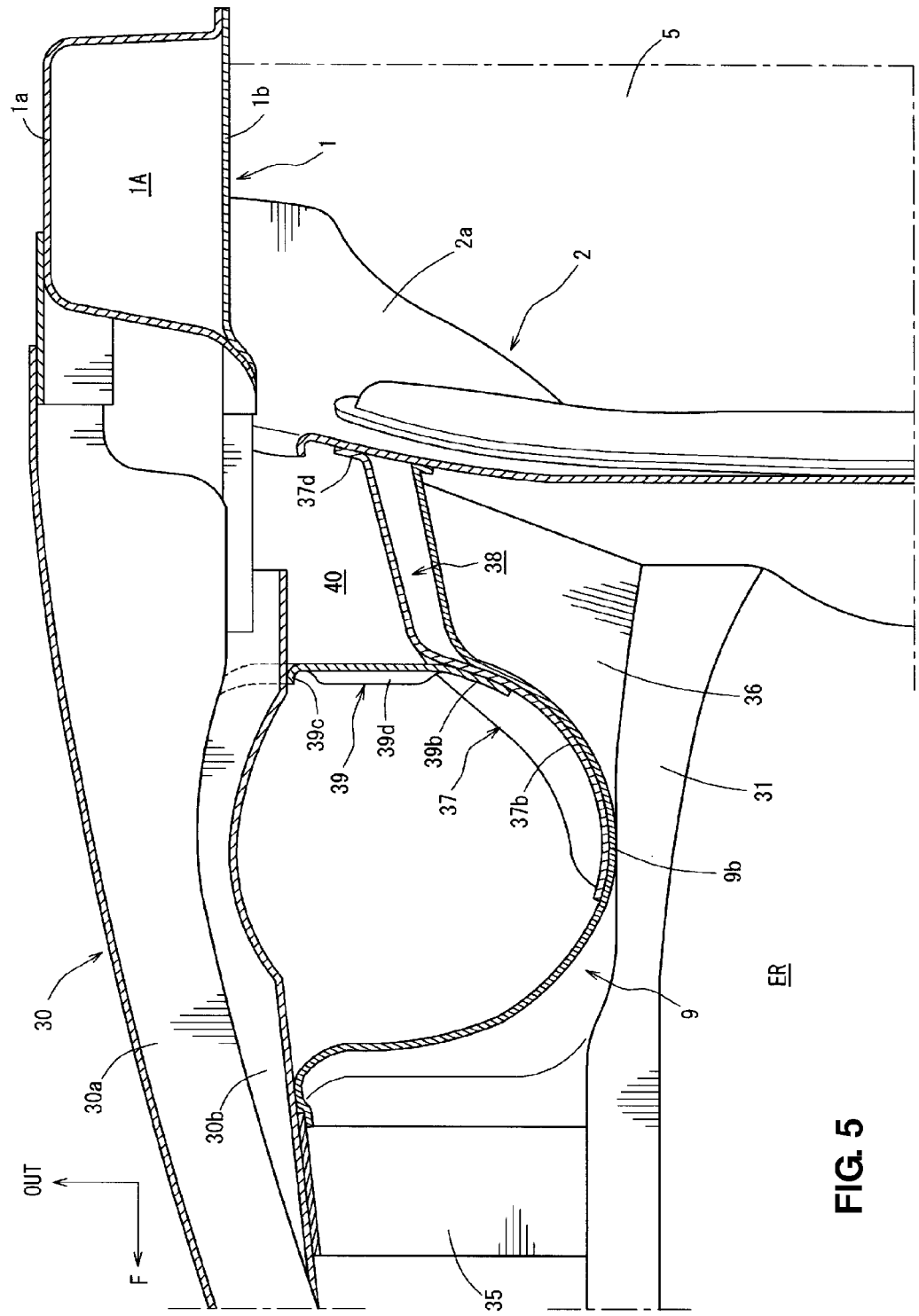
FIG. 5 is a sectional view taken along line B-B of FIG. 4.
Figure 6:
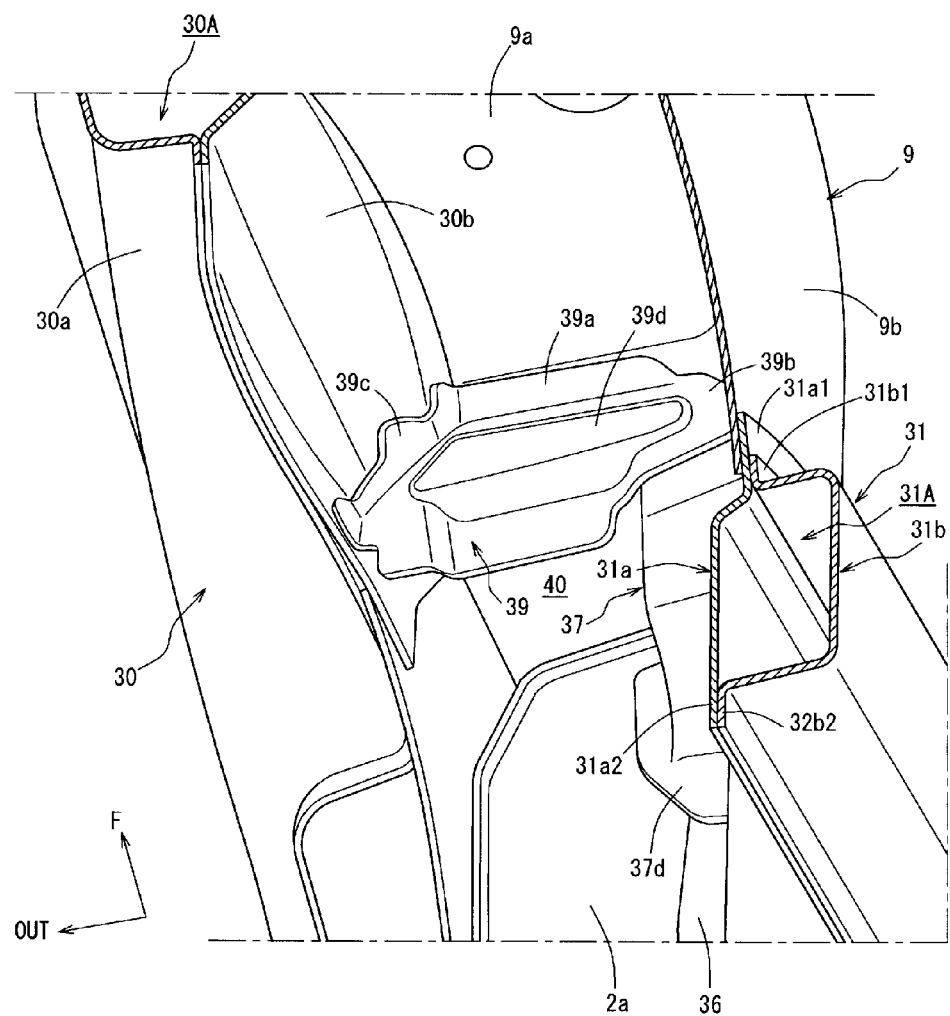
FIG. 6 is a perspective view of a major part of the vehicle-body front portion, when viewed from below.

FIG. 1 is a side view of a vehicle-body front portion, when viewed from a vehicle center in a vehicle width direction, and FIGS. 2 and 3 are a perspective view and a plan view of FIG. 1, respectively. FIG. 4 is a sectional view taken along line A-A of FIG. 3, FIG. 5 is a sectional view taken along line B-B of FIG. 4, and FIG. 6 is a perspective view of a major part of the vehicle-body front portion, when viewed from below. In these figures, an arrow F shows a vehicle front side, an arrow R shows a vehicle rear side, an arrow IN shows a vehicle inside, and an arrow OUT shows a vehicle outside.

As shown in FIGS. 1 and 2, a pair of hinge pillars 1, 1 (only a right-side hinge pillar is shown in the drawings) is provided at both sides of the vehicle. The hinge pillar 1 is a vehicle-body rigidity member which comprises a hinge pillar outer 1a (see FIG. 5) and a hinge pillar inner 1b (see FIG. 5) which are connected to each other, and has a pillar closed cross section 1A (see FIG. 5) which extends vertically.

A dash panel 2 (a dash lower panel 2a) is connected and fixed to the pair of hinge pillars 1, 1, specifically, a pair of hinge pillar inners 1a, 1a. The hinge pillars 1, 1 rise vertically from both-side end portions of the dash panel 2.

Further, at the vehicle-body front portion, the dash panel 2 partitions an engine room ER from a vehicle compartment 3, and a front pillar 4 is connected and fixed to an upper portion of each hinge pillar 1 and extends upwardly toward a vehicle rear.

A floor panel 5 is fixed to a lower rear end portion of a dash lower panel 2a which constitutes a lower portion of the dash panel 2. The floor panel 5 extends rearward substantially horizontally to form a bottom face of the vehicle compartment 3. At a central portion, in the vehicle width direction, of the floor panel 5, as shown in FIG. 2, is formed a tunnel portion 5a which projects toward the inside of the vehicle compartment 3 and extends longitudinally. This tunnel portion 5a provides a primary rigidity of the vehicle body.

Further, as shown in FIG. 1, a pair of side sills 6, 6 extending in a vehicle longitudinal direction is provided at both-side end portions of the floor panel 5 (only the right-side side sill is illustrated in the drawings). The side sill 6 is a vehicle-body rigidity member which comprises a side sill inner and a side sill outer which are connected to each other, and has a side sill closed cross section which extends in the vehicle longitudinal direction.

As shown in this figure, a door opening portion 7 for egress and ingress of a passenger seated in a front seat is enclosed and formed by the hinge pillar 1, the front pillar 4, the side sill 6 and others. A front door, not illustrated, is provided to open or close the door opening portion 7.

Meanwhile, as shown in FIGS. 1, 2 and 4, a dash upper panel 2b is fixed to an upper-end bent portion of the dash lower panel 2a, and a cowl panel 8 is fixed to an upper portion and a front portion of the dash upper panel 2b.

As shown in FIGS. 1-6, a suspension tower 9 which protrudes inwardly in the vehicle width direction, corresponding to a front wheel W illustrated by a two-dotted broken line in FIGS. 3 and 4, is provided forwardly away from the dash lower panel 2a.

A front suspension 10 is disposed inside the suspension tower 9, corresponding to the front wheel W, as illustrated by a two-dotted broken line in FIG. 4. The front suspension 10 comprises a wheel support 11 to rotationally support the front wheel W, an upper arm 12 and a lower arm 13 which are arranged above and below, and a damping device 14.

The upper arm 12 is pivotally attached to a vehicle-body-side bracket, not illustrated, around its axis member extending in the vehicle longitudinal direction at an inside end portion thereof in the vehicle width direction. Meanwhile, its outside end portion is jointed to an upper end portion of an upper extension portion 11a formed at the wheel support 11 via a ball joint.

The lower arm 13 is, similarly to the upper arm 12, pivotally attached to a sub frame 20, as a suspension support frame, around its axis member 13A extending in the vehicle longitudinal direction at an inside end portion thereof in the vehicle width direction. Meanwhile, its outside end portion is jointed to a lower end portion of a lower extension portion 11b formed at the wheel support 11 via another ball joint.

The damping device 14 comprises a damper 15 and a coil spring 16. The damper 15 is fixed to a top portion 9a of the suspension tower 9 at its upper end portion, and its lower end portion is attached to a central portion, in the vehicle width direction, of the lower arm 13 rotationally around an axis member 15A extending in the vehicle longitudinal direction. The expandable coil spring 16 is arranged around the damper 15.

Herein, on the outside of an upper portion of the above-described suspension tower 9 is, as shown in FIGS. 1-6, provided an apron frame 30 which extends forwardly from an upper portion of the hinge pillar 1, so that the upper portion of an outside wall face of the suspension tower 9 and the apron frame 30 are connected to each other. This apron frame 30 comprises, as shown in FIG. 4, an apron frame outer 30a and an apron frame inner 30b, and these frame members 30a, 30b are connected to each other to form a closed cross section 30A which extends longitudinally.

Further, as shown in FIGS. 1-6, a front side frame 31 which extends forwardly from a side portion of the dash panel 2 is connected to a lower portion of an inside wall face of a side face portion 9b of the suspension tower 9, which is provided substantially in parallel to the above-described apron frame 30. The front side frame 31 comprises, as shown in FIGS. 4 and 6, an outer panel 31a and an inner panel 31b, which is a vehicle-body rigidity member which extends in the vehicle longitudinal direction beside the engine room ER and is connected to the suspension tower 9, a rear end portion of which curves downwardly and connects to a front portion of a floor frame 32 (see FIGS. 1 and 2).

The front side frame 31 forms a closed cross section 31A extending longitudinally at a position of A-A cross section of FIG. 3 with its outer panel 31a and its inner panel 31b which are jointed together at their respective joint flanges 31a1, 31a2, 31b1, 31b2 as shown in FIG. 4.

Further, the front side frame 31 is fixed to a lower portion of the dash lower panel 2a as shown in FIGS. 1, 2, 4 and 5.

To a front end portion of the front side frame 31 is attached a plate 33 (see FIG. 1) for attaching a crash box (not illustrated) which is crushable longitudinally by the collision load from the vehicle front. Further, a plate-shaped connecting member 34 is attached to the plate 33 such that it extends to a front end portion of the apron frame 30.

A front apron panel 35 is arranged in front of the suspension tower 9, and a rear apron panel 36 is arranged in back of the suspension tower 9 and between the suspension tower 9 and the dash panel 2. Respective lower side portions of the suspension tower 9, the front apron panel 35 and the rear apron panel 36 are connected to an outside wall face of the flange 31a1 of the outer panel 31a of the front side frame 31.

Further, as shown in FIGS. 1-6, a vertical branch brace 37 (see FIGS. 4 and 5) is provided to extend upwardly from the front side frame 31 along an inner face of the suspension tower 9 to form a closed cross section 38 with the suspension tower 9. Specifically, the vertical branch brace 37 is connected to a rear portion of the suspension tower 9 and the rear apron panel 36 such that the closed cross section 38 formed by the vertical branch brace 37 and the rear portion of the suspension tower 9 and the rear apron panel 36 extends from the front side frame 31 to an upper portion of the rear apron panel 36.

The above-described vertical branch brace 37 is configured such that it has a U-shaped cross section at its portion connected to an outside wall face of the side face portion 9b of the suspension tower 9 and it has an L-shaped cross section at its portion connected to an outside wall face of the rear apron panel 36.

The vertical branch brace 37 comprises a lower end flange 37a which is connected to the front side frame 31 as shown in FIGS. 1, 2 and 4, a middle upper flange 37b and a middle lower flange 37c which are formed at upper and lower portions of a middle portion, in the longitudinal direction, of the vertical branch brace 37 and connected to respective outside wall faces of the rear portion of the suspension tower 9 and the rear apron panel 36 as shown in FIGS. 1, 2, 4 and 5, and a rear end flange 37d which is connected to an upper portion of a side end of the dash lower panel 2a as shown in FIGS. 5 and 6.

In the present embodiment, a deformation restraint member 39 is further provided at a rear end portion of the suspension tower 9 in an inner space of the suspension tower 9 as shown in FIGS. 1-6. This deformation restraint member 39 is a plate member extending vertically, which comprises an upper flange 39a which extends upwardly along an upper portion of a rear inside wall face of the suspension tower 9, an inside flange 39b which extends inwardly in the vehicle width direction along the upper portion having the U-shaped cross section and the middle upper flange 37b of the vertical branch brace 37, and an outside flange 39c which extends forwardly and outwardly in the vehicle width direction along the apron flame inner 30b of the apron frame 30.

The upper flange 39a of the deformation restraint member 39 is connected to the upper portion of the rear inside wall face of the suspension tower 9, the inside flange 39b is connected to the upper portion having the U-shaped cross section and the middle upper flange 37b of the vertical branch brace 37, and the outside flange 39c is connected to the apron frame inner 30b of the apron frame 30. Accordingly, the apron frame 30 and the vertical branch brace 37 are interconnected by the deformation restraint member 39.

Behind the suspension tower 9 is, as shown in FIGS. 5 and 6, formed a closed space 40 which is partitioned (formed) by the dash panel 2, the apron frame 30, the vertical branch brace 37, and the deformation restraint member 39.

The deformation restraint member 39 has a rib 39d at its central portion which protrudes forwardly for ensuring a proper rigidity thereof.

When the collision load is inputted from the vehicle front in the vehicle frontal collision, part of that is inputted to the front side frame 31 and transmitted to the vehicle rear (the rear vehicle body). Herein, according to the present embodiment, the above-described part of the collision load is transmitted to the lower portion of the vehicle through the front side frame 31, and also transmitted to the upper portion of the dash lower panel 2a via the vertical branch brace 37 which branches from the front side frame.

Then, the load transmitted via the vertical branch brace 37 is transmitted to the hinge pillar 1 via the dash lower panel 2a, and then to the front pillar 4. Thereby, part of the collision load is transmitted and dispersed via the hinge pillar 1, the front pillar 4 and the like, and further to the vehicle rear through a roof panel and a roof side rail, not illustrated.

Further, when the collision load is inputted from the vehicle front in the vehicle frontal collision, the front side frame 31 and the apron frame 30 receive inputs of the collision load from the vehicle front concurrently. Herein, the load acting on the apron frame 30 may operate so as to deform the apron frame 30 provided on the outside of the front side frame outwardly in the vehicle width direction. According to the present embodiment, however, since the apron frame 30 and the vertical branch brace 37 are interconnected by the deformation restraint member 39, the above-described outward deformation of the apron frame 30 can be properly restrained.

This restraint of the outward deformation of the apron frame 30 by the deformation restraint member 39 can improve the rigidity around the connection portion of the hinge pillar 1 to the side end portion of the dash panel 2, so that it can be properly prevented that the connection portion of the hinge pillar 1 to the dash panel 2 is broken and thereby these members 1, 12 are disconnected.

Accordingly, even when a power train, such as an engine or motor, not illustrated, retreats and the load is inputted to the dash panel 2 from the vehicle front in the vehicle frontal collision, the dash panel 2 can be restrained from moving back into the vehicle compartment too much, thereby ensuring the appropriate vehicle function against collisions. Further, since the closed cross section 38 is formed by the inner face of the suspension tower 9 and the vertical branch brace 37, the vertical branch brace 37 can reinforce the suspension tower 9 properly, thereby restraining deformation of the suspension tower 9.

Moreover, since the deformation restraint member 39 is connected to the rear end portion of the suspension tower 9, even when it is inputted to the suspension tower 9 from the vehicle front in the vehicle frontal collision, the collision load can be transmitted and dispersed to the vertical branch brace 37 and the apron frame 30 through the deformation restraint member 39. Thus, an efficient disperse of the collision load to the vehicle rear can be achieved, so that an impact applied to the suspension tower 9 can be decreased, and retreat and deformation of the suspension tower 9 can be restrained.

Accordingly, the transmission and disperse of the collision load via the vertical branch brace 37 can be achieved efficiently.

Further, while it is considered that a large load may be inputted to the suspension tower 9 (the top portion 9*a*) from the front wheel W via the front suspension 10 in the vehicle frontal collision, since the large load inputted to the suspension tower can be transmitted and dispersed to the vertical branch brace 37 and the apron frame 30 through the deformation restraint member 39, the retreat and deformation of the suspension tower 9 can be restrained as well.

Also, since the deformation restraint member 39, the vertical branch brace 37, the dash panel 2, and the apron frame 30 form the closed space 40, the rigidity of the vehicle rear body in back of the suspension tower 9 can be improved. Accordingly, the collision load from the vehicle front can be efficiently transmitted and dispersed to the vehicle rear.

Further, since the deformation restraint member 39 is comprised of the plate member, the lightweight vehicle structure can be provided, ensuring the appropriate vehicle function against collisions.

The present invention should not be limited to the above-described embodiment, and any other modifications and improvements may be applied within the scope of a sprit of the present invention.

For example, while the deformation restraint member 39 is provided at the rear end portion of the suspension tower 39 in the present embodiment shown in FIGS. 1-6, it may be provided at a front end portion of the suspension tower 39.

What is claimed is:

1. A vehicle-body front structure, comprising:
   a front side frame extending forwardly from a side portion of a dash panel of a vehicle;
   a hinge pillar extending vertically from a side end portion of the dash panel;
   an apron frame provided on an outside of the front side frame in a vehicle width direction and extending forwardly from the hinge pillar;
   a suspension tower protruding toward a vehicle inside, an upper portion of which is connected the apron frame and a lower portion of which is connected to the front side frame;
   a rear apron panel provided between the suspension tower and the dash panel;
   a vertical branch brace provided to extend upwardly from said front side frame and connected to an outside wall face of the suspension tower in the vehicle width direction so as to form a closed cross section between the vertical branch brace and the outside wall face of the suspension tower; and
   a deformation restraint member provided inside the suspension tower to interconnect the apron frame and the vertical branch brace.

2. The vehicle-body front structure of claim 1, wherein said vertical branch brace is connected to an outside wall portion of a rear portion of said suspension tower and an outside wall portion of said rear apron panel such that a closed cross section formed by the vertical branch brace and the rear portion of the suspension tower and the rear apron panel extends from said front side frame to an upper portion of the rear apron panel.

3. The vehicle-body front structure of claim 1, wherein said deformation restraint member is connected to a rear end portion of said suspension tower.

4. The vehicle-body front structure of claim 1, wherein said deformation restraint member, said vertical branch brace, said dash panel, and said apron frame form a closed space.

5. The vehicle-body front structure of claim 1, wherein said deformation restraint member is comprised of a plate member which extends vertically.

6. The vehicle-body front structure of claim 2, wherein said deformation restraint member is connected to a rear end portion of said suspension tower.

7. The vehicle-body front structure of claim 2, wherein said deformation restraint member, said vertical branch brace, said dash panel, and said apron frame form a closed space.

8. The vehicle-body front structure of claim 2, wherein said deformation restraint member is comprised of a plate member which extends vertically.

9. The vehicle-body front structure of claim 3, wherein said deformation restraint member, said vertical branch brace, said dash panel, and said apron frame form a closed space.

10. The vehicle-body front structure of claim 3, wherein said deformation restraint member is comprised of a plate member which extends vertically.

11. The vehicle-body front structure of claim 4, wherein said deformation restraint member is comprised of a plate member which extends vertically.

12. The vehicle-body front structure of claim 9, wherein said deformation restraint member is comprised of a plate member which extends vertically.

* * * * *